US008683158B2

(12) United States Patent  (10) Patent No.: US 8,683,158 B2
Dixon et al.  (45) Date of Patent: Mar. 25, 2014

(54) STEERING SYSTEM MANAGEMENT CODE REGION ACCESSES

(75) Inventors: Martin G. Dixon, Portland, OR (US); David A. Koufaty, Portland, OR (US); Camron B. Rust, Hillsboro, OR (US); Hermann W. Gartler, Portland, OR (US); Frank Binns, Cambridgeshire (GB)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 11/322,756

(22) Filed: Dec. 30, 2005

(65) Prior Publication Data

US 2007/0156978 A1  Jul. 5, 2007

(51) Int. Cl.
 *G06F 12/14* (2006.01)
(52) U.S. Cl.
 USPC .......... 711/163; 711/152; 710/260; 710/261; 726/27
(58) Field of Classification Search
 USPC ............. 711/152, 163; 710/260, 261; 726/27
 See application file for complete search history.

(56) References Cited

U.S. PATENT DOCUMENTS

| | | | | |
|---|---|---|---|---|
| 5,063,496 A | * | 11/1991 | Dayan et al. | 726/27 |
| 5,475,829 A | * | 12/1995 | Thome | 711/152 |
| 5,596,741 A | * | 1/1997 | Thome | 711/163 |
| 5,657,475 A | | 8/1997 | Gillespie et al. | |
| 5,909,696 A | | 6/1999 | Reinhardt | |
| 6,044,478 A | * | 3/2000 | Green | 714/42 |
| 6,049,852 A | | 4/2000 | Oba | |
| 6,081,664 A | * | 6/2000 | Nowlin, Jr. | 717/127 |
| 6,093,213 A | * | 7/2000 | Favor et al. | 703/27 |
| 6,192,455 B1 | | 2/2001 | Bogin et al. | |
| 6,453,278 B1 | * | 9/2002 | Favor et al. | 703/27 |
| 6,711,653 B1 | * | 3/2004 | Quach et al. | 711/146 |
| 6,745,296 B2 | * | 6/2004 | Chong | 711/138 |
| 2002/0156981 A1 | * | 10/2002 | Chong | 711/138 |
| 2003/0014667 A1 | | 1/2003 | Kolichtchak | |
| 2006/0036830 A1 | * | 2/2006 | Dinechin et al. | 711/200 |
| 2007/0079090 A1 | * | 4/2007 | Rajagopal et al. | 711/163 |

FOREIGN PATENT DOCUMENTS

| | | |
|---|---|---|
| CN | 1228177 A | 9/1999 |
| EP | 0864983 A | 9/1998 |
| JP | 62126448 A | 6/1987 |
| WO | 9746937 A | 12/1997 |

(Continued)

OTHER PUBLICATIONS

AMD. BIOS and Kernel Developer's Guide for AMD Athlon 64 and AMD Opteron Processors. Sep. 2003. pp. 17, 133, 167-180.*

(Continued)

*Primary Examiner* — Sanjiv Shah
*Assistant Examiner* — Samuel Dillon
(74) *Attorney, Agent, or Firm* — Trop, Pruner & Hu, P.C.

(57) ABSTRACT

Apparatuses and methods for steering SMM code region accesses are disclosed. In one embodiment, an apparatus includes a status indicator, a base storage location, and an abort storage location. The status indicator is to indicate whether the apparatus is operating in SMM. The base storage location is to store a base address and the abort storage location is to store an abort address. The base address is to specify a first memory address region at which SMM code is to be accessed. The abort address is to specify a second memory address region to which accesses to the first memory address region are to be steered if the apparatus is not operating in SMM.

17 Claims, 2 Drawing Sheets

(56) References Cited

FOREIGN PATENT DOCUMENTS

| WO | 2006048556 | 12/2006 |
|---|---|---|
| WO | 2007/078959 A2 | 7/2007 |
| WO | 2007/078959 A3 | 12/2007 |

OTHER PUBLICATIONS

Duflot, Loïc, Daniel Etiemble, and Olivier Grumelard. "Using CPU system management mode to circumvent operating system security functions." CanSecWest/core06 (2006).*

Office Action received for German Patent Application No. 112006003132.5, mailed on Jan. 7, 2009, 2 pages of Office Action and 1 page of English translation.

Office Action received for German Patent Application No. 112006003132.5, mailed on Nov. 26, 2009, 3 pages of Office Action and 2 pages of English translation.

International Search Report and Written Opinion received for PCT Application No. PCT/US2006/048556, mailed on Sep. 28, 2007, 12 pages.

International Preliminary Report on Patentability and Written Opinion received for PCT Application No. PCT/US2006/048556, mailed on Jul. 10, 2008, 7 pages.

Office Action received for Chinese Patent Application No. 200680049977.6, mailed on Jun. 2, 2010, 7 pages of Office Action and 11 pages of English translation.

* cited by examiner

STEERING SYSTEM MANAGEMENT CODE REGION ACCESSES

BACKGROUND

1. Field

The present disclosure pertains to the field of information processing, and, more specifically, to the field of memory management and protection.

2. Description of Related Art

Information processing systems, such as those including a processor in the Pentium® Processor Family from Intel Corporation, may provide a system management mode ("SMM"), which is an operating environment that is parallel to the normal execution environment and may be used to perform special tasks such as system management, device management, power management, thermal management, reliability functions, availability functions, serviceability functions, etc. SMM is typically entered by asserting a system management interrupt pin and exited by executing a resume instruction. Since SMM is a separate operating environment, it has its own private memory space that must be protected from the normal execution environment. Although this private memory space is separate from regular system memory, it is mapped to an address region in regular system memory.

The address region in regular system memory to which SMM code is mapped should only be accessible during SMM operation. However, since a typical cache does not distinguish between SMM code and other code, a known virus exploit involves writing to a cache at an address to which SMM code is mapped. One approach to protecting SMM code from this exploit it to use memory type range registers ("MTRRs") to set SMM code regions as un-cacheable during normal execution, write-back cacheable on entry to SMM, and back to un-cacheable on resume.

BRIEF DESCRIPTION OF THE FIGURES

The present invention is illustrated by way of example and not limitation in the accompanying figures.

DETAILED DESCRIPTION

The following description describes embodiments of techniques for steering SMM code region accesses. In the following description, numerous specific details such as processor and system configurations are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for SMM code region accesses. Such steering may be desirable to protect SMM code from being accessed during normal execution. Embodiments of the present invention may be implemented without incurring the performance penalty of changing memory types between cacheable and un-cacheable in connection with transitions between SMM and normal execution mode.

Figure 1:
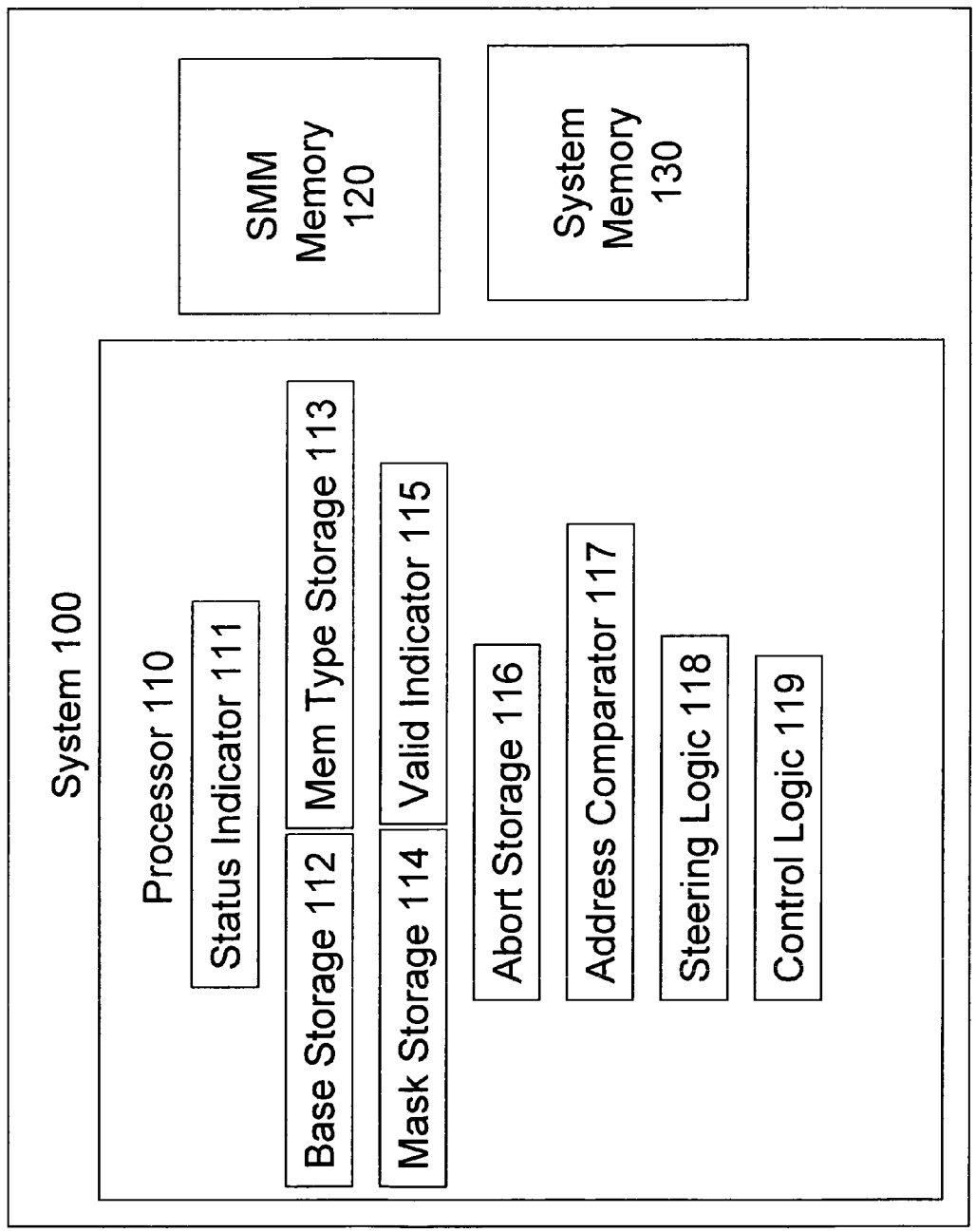
FIG. 1 illustrates an embodiment of the invention in a processor including logic for steering SMM code region accesses.

FIG. 1 illustrates an embodiment of the invention in a processor, processor 110, including logic for steering accesses to SMM code regions. Processor 110 is shown in system 100, which also includes SMM memory 120 and normal system memory 130.

Processor 110 may be any of a variety of different types of processors, such as a processor in the Pentium® Processor Family, the Itanium® Processor Family, or other processor family from Intel Corporation, or any other general purpose or other processor from another company. Although FIG. 1 illustrates the invention embodied in a processor, the invention may alternatively be embodied in any other type of data processing component or apparatus. In the embodiment of FIG. 1, processor 110 includes status indicator 111, base storage location 112, memory type storage location 113, mask storage location 114, valid indicator 115, abort storage location 116, address comparator 117, steering logic 118, and control logic 119.

Status indicator 111 is to indicate whether processor 110 is operating in SMM. Status indicator 111 may be any field or indicator in any storage location, such as a status bit in a register that is set to one by control logic 119 (described below) when processor 110 enters SMM and cleared to zero when processor 110 exits SMM.

Base storage location 112 is to store a base address. The base address is to specify a memory address region at which SMM code is to be accessed (the "SMM region"). Base storage location 112 may be any field in any storage location. In one embodiment, base storage location 112 may be bits 31:12 of a 64-bit model-specific register (the "base system management range register" or "base SMRR"), to specify a 4K aligned base address.

Memory type storage location 113 is to store the memory type (e.g., un-cacheable, write-back cacheable, write-protected cacheable, write-through cacheable, etc.) of the region specified by the base address. Memory type storage location 113 may be any field in any storage location. In one embodiment, memory type storage location 113 may be bits 7:0 of the base SMRR.

Mask storage location 114 is to store a mask value to be used to mask selected bits when comparing an address used in a memory access to the base address. Mask storage location 114 may be any field in any storage location. In one embodiment, mask storage location 114 may be bits 31:12 of a 64-bit model specific register (the "mask system management range register" or "mask SMRR"), to specify the masked bits of a base address to be stored in the base SMRR.

Valid indicator 115 is to indicate whether base storage location 112 and mask storage location 114 are storing valid values. Valid indicator 115 may be any field or indicator in any storage location, and may be set by a system management initialization code, a system management handler, or any other software, firmware, or hardware. In one embodiment, valid indicator may be bit 11 of the mask SMRR.

Abort storage location 116 is to store an abort address. The abort address is to specify a memory address region (the "abort region") to which accesses to the SMM region are to be steered if processor 110 is not operating in SMM. Abort storage location 116 may be any field in any storage location. In one embodiment, abort storage location 116 may be a register. In one embodiment the abort address is a system memory address of a handler. Any code, such an operating system routine, to handle the access may be stored in the abort region.

Address comparator 117 is to compare an address used in a memory access to the base address. The comparison may be performed according to any known approach, and may use a mask value from mask storage location 114 to mask selected bits of the comparison.

Steering logic 118 is to steer SMM region accesses to the abort region if processor 110 is not operating in SMM. The steering may be performed according to any known approach, such as substituting the abort address for the base address on an internal or external address bus.

Control logic 119 is to allow the programming of the storage locations and indicators described above only while processor 110 is in SMM. Control logic 119 may be microcode, programmable logic, hard-coded logic, or any other form of control logic within processor 110. In other embodiments, control logic 119 may be implemented in any form of hardware, software, or firmware, such as a processor abstraction layer, within a processor or within any component accessible or medium readable by a processor, such as SMM memory 120.

In FIG. 1, memories 120 and 130 may be static or dynamic random access memory, semiconductor-based read only or flash memory, magnetic or optical disk memory, any other type of medium readable by processor 110, or any combination of such mediums. SMM memory 120 is to store SMM code. Normal system memory 130 is to store code, including operating system and application program code.

Processor 110 and memories 120 and 130 may be coupled to or communicate with each other according to any known approach, such as directly or indirectly through one or more buses, point-to-point, or other wired or wireless connections, and/or through any other components such as a chipset or memory controller. System 100 may also include any number of additional components or connections.

Figure 2:
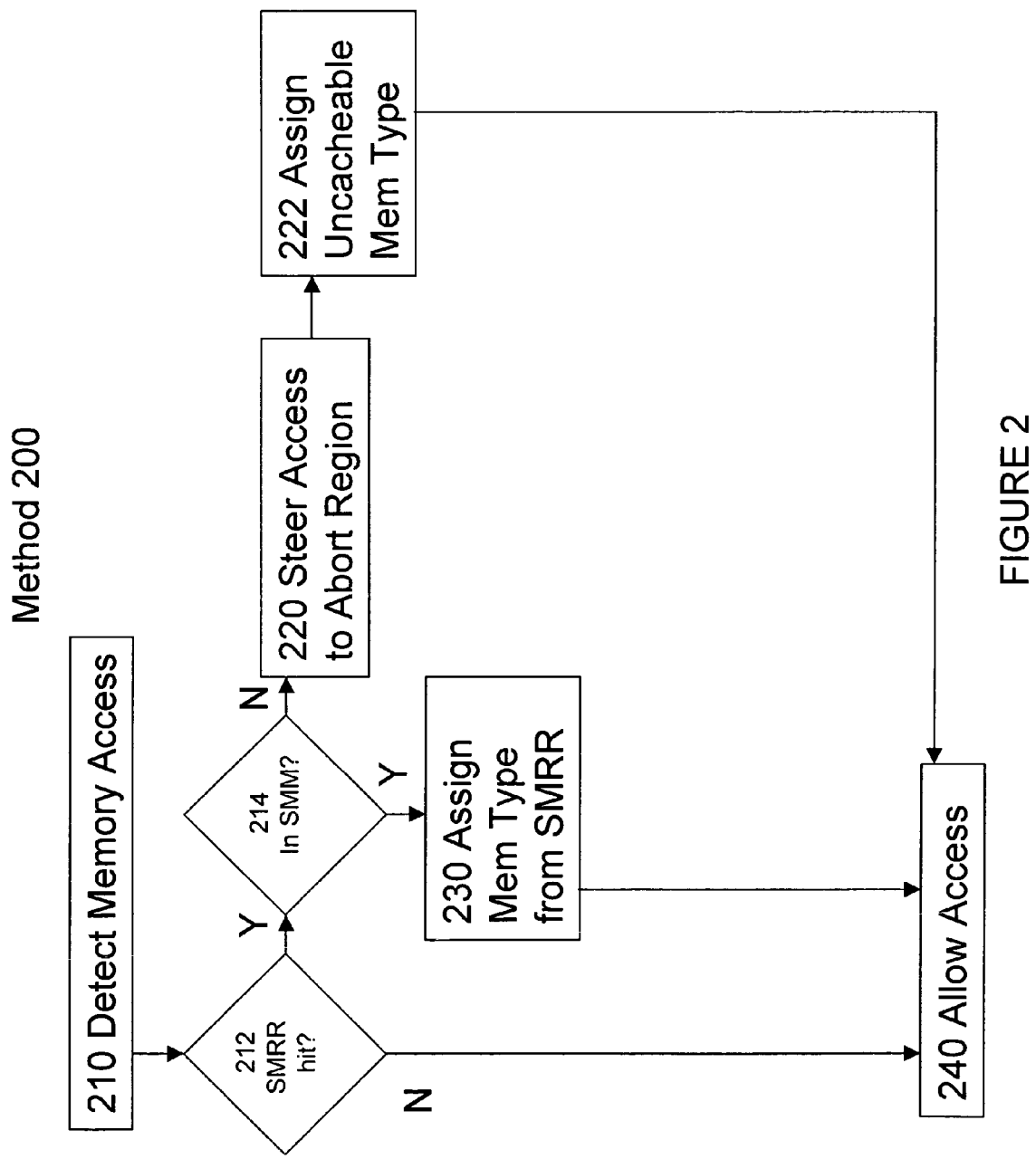
FIG. 2 illustrates an embodiment of the invention in a method for steering SMM code region accesses.

FIG. 2 illustrates an embodiment of the present invention in a method, method 200, for steering SMM code region accesses. In block 210, a memory access, for example, as a result of the fetching, decoding, execution, or attempted execution of a read or write instruction, is detected. The memory access initiates a lookup in an MTRR to determine the memory type of the accessed memory region.

In block 212, the address associated with the memory access in block 210 is compared to the base address from the base SMRR, using the mask from mask SMRR, e.g., by address comparator 117. If the addresses do not match, the access is allowed in block 240. If the addresses match, then, in block 214, status indicator 111 is checked to determine if processor 110 is in SMM.

From block 214, if processor 110 is not in SMM, then, in block 220, steering logic 118 steers the access to the abort region, for example by replacing the base portion of the address associated with the memory access with the abort address. In block 222, control logic 119 assigns an un-cacheable memory type to the memory access. In block 240, the access is allowed.

From block 214, if processor 110 is in SMM, then, in block 230, the memory type from the base SMRR is assigned to the memory access. In block 240, the access is allowed.

Within the scope of the present invention, method 200 may be performed in a different order, with illustrated block performed simultaneously, with illustrated blocks omitted, with additional blocks added, or with a combination of reordered, combined, omitted, or additional blocks.

Thus, techniques for steering SMM code region accesses are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a processor including:
a status indicator to indicate whether the processor is operating in a system management mode (SMM);
a base storage location to store a base address, where the base address is to specify a system management mode memory region (SMMR) of a system memory at which system management code is to be accessed;
an abort storage location to store an abort address, where the abort address is to specify an other memory region of the system memory to which accesses to the system management mode memory region are to be steered in response to the processor not operating in the SMM, the other memory region to store code other than the system management code;
steering logic to steer SMMR accesses to the other memory region in response to the processor not operating in the SMM; and
control logic to:
responsive to the processor not operating in the SMM, permit a first SMMR access to be steered to the other memory region via the steering logic, prevent the first SMMR access from access to the SMMR, and assign an un-cacheable memory type to the first SMMR access; and
responsive to the processor operating in the SMM, allow the first SMMR access to access the SMMR and assign a memory type of the SMMR to the first SMMR access.

2. The apparatus of claim 1, further comprising a memory type storage location to store the memory type of the SMMR.

3. The apparatus of claim 1, further comprising a comparator to compare the base address to an address associated with a memory access.

4. The apparatus of claim 3, further comprising a mask storage location to store a mask to specify address bits to be masked by the comparator.

5. The apparatus of claim 1, wherein the processor further comprises a valid indicator to indicate whether the base storage location is storing a valid value.

6. The apparatus of claim 5, wherein the valid indicator is to be stored in a mask system management range register that is also to store a mask value to mask selected bits in comparison of an address of a memory access to a base address of the SMMR.

7. The apparatus of claim 1, wherein the control logic is further to:
responsive to the processor in the SMM, allow storage locations in the SMMR to be programmed; and
responsive to the processor not in the SMM, prohibit the storage locations in the SMMR from being programmed.

8. A method comprising:
detecting a memory access request;
comparing an address associated with the memory access request to a base address to determine whether the memory access request is directed to a system management code region of a system memory, wherein the comparing includes masking selected bits of the base address responsive to reading a mask storage location that indicates which bits of the base address are to be selected to be masked; and in response to the memory access request being directed to the system management code region:
- when the memory access request is being performed while a processor is not in a system management mode, steering a memory access associated with the memory access request to another region in the system memory and assigning an un-cacheable memory type to the memory access; and
- when the memory access request is being performed while the processor is in the system management mode, permitting the memory access to the system management code region and assigning a memory type of the system management code region to the memory access.

9. The method of claim 8, further comprising reading the base address from a base address storage location.

10. The method of claim 8, further comprising:
responsive to the memory access request, initiating a lookup in a memory type range register to determine the memory type of the system management code region.

11. The method of claim 8, further comprising determining whether the memory access is performed in the system management mode by checking a status indicator.

12. The method of claim 8, wherein steering the memory access to the other region includes replacing a portion of an address associated with the memory access with an abort address.

13. The method of claim 12, further comprising reading the abort address from an abort address storage location.

14. A system comprising:
a dynamic random access memory; and
a processor including:
- a status indicator to indicate whether the processor is operating in a system management mode (SMM);
- a base storage location to store a base address, wherein the base address is to specify a system management mode memory region (SMMR) at which system management code is to be accessed;
- an abort storage location to store an abort address, wherein the abort address is to specify an other memory address region to which accesses to the SMMR are to be steered in response to the processor not operating in the system management mode, the other memory region to store code other than the system management code;
- steering logic to steer SMMR accesses to the other memory region in response to the processor not operating in the SMM; and
- control logic to:
  - responsive to the processor not operating in the SMM, permit a first SMMR access to be steered to the other memory region via the steering logic, prevent the first SMMR access from access to the SMMR, and assign an un-cacheable memory type to the first SMMR access; and
  - responsive to the processor operating in the SMM, allow the first SMMR access to access the SMMR and assign a memory type of the SMMR to the first SMMR access.

15. The system of claim 14, wherein the dynamic random access memory is to store the system management code.

16. The system of claim 14, wherein the dynamic random access memory is to store handler code to handle accesses to the SMMR in response to the processor not operating in the SMM.

17. The system of claim 14, wherein the processor further comprises a memory type storage location to store the memory type of the SMMR.

* * * * *